J. H. ABBOTT.
SUCTION FOR DENTAL PLATES.
APPLICATION FILED AUG. 9, 1911.
1,092,554.
Patented Apr. 7, 1914.
2 SHEETS—SHEET 1.
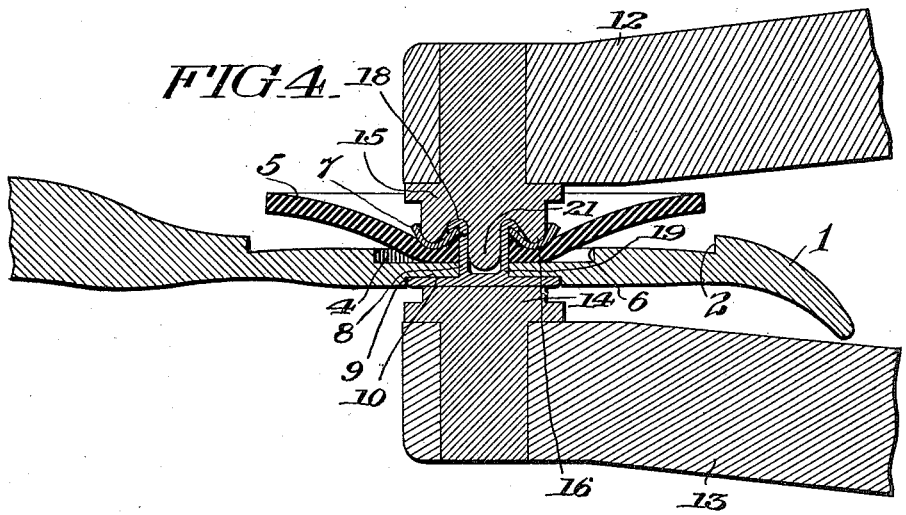

J. H. ABBOTT.
SUCTION FOR DENTAL PLATES.
APPLICATION FILED AUG. 9, 1911.
1,092,554.
Patented Apr. 7, 1914.
2 SHEETS—SHEET 2.
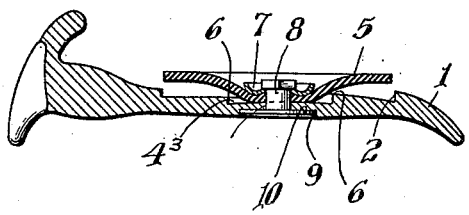
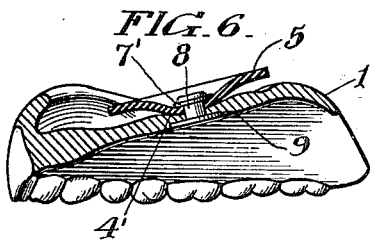
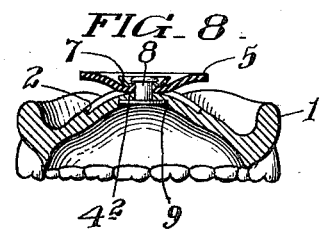
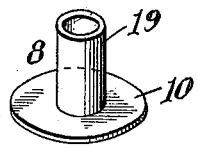
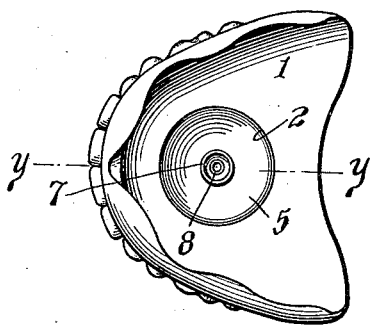
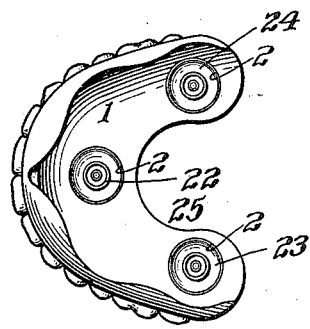
WITNESSES
INVENTOR
James Herman Abbott
BY
ATTORNEY

UNITED STATES PATENT OFFICE.

JAMES HERMAN ABBOTT, OF PHILADELPHIA, PENNSYLVANIA.

SUCTION FOR DENTAL PLATES.

1,092,554. Specification of Letters Patent. Patented Apr. 7, 1914.

Application filed August 9, 1911. Serial No. 643,111.

*To all whom it may concern:*

Be it known that I, JAMES HERMAN ABBOTT, a citizen of the United States, and a resident of Philadelphia, Pennsylvania, have invented a certain new and useful Suction for Dental Plates, of which the following is a specification.

My invention consists in a dental suction seat which shall be at the same height, axially of the fastening for the suction, at substantially equal distances from the axis of the fastening, and to clamp or pinch an apertured suction disk or cup tightly against the seat by pressure exerted equally at equal distances about the aperture and greater at a distance from the aperture than at the edge thereof. The seat thus becomes substantially a surface of revolution about the axis of the fastening and, preferably plane, may be desirably concave and permissibly even slightly convex.

Among various forms in which my invention does and may exist, I have selected the several structures illustrated because of their simplicity, effectiveness, inexpensiveness and their ease and speed of application.

Figure 1 is a perspective view of a dental plate. Fig. 2 is a transverse section upon line $x$—$x$ of Fig. 1. Figs. 3 and 4 are transverse sections of the elements entering into one embodiment of my invention in spaced and assembled positions, respectively. Figs. 5, 6, 7 and 8 are transverse sections of plates and suctions, the last named showing a rivet-set in elevation. Figs. 9 and 10 are a perspective and section, respectively, of my preferred rivet and washer. Figs. 11 and 12 are elevations of plates with my suctions applied, the section line $y$—$y$ of Fig. 11 indicating the planes of the sections shown in Figs. 3–8.

In my invention I have sought particularly to avoid necessity for vulcanization of the suction; to secure uniform and complete sealing of the suction about its center by clamp action; to cause effective cupping of the suction disk by clamping action; to adapt the suction equally to old and new plates of existing types and forms and of all materials; and to place renewals as quickly and as effectively as new constructions.

In the drawings, 1 designates a dental plate, here illustrated as an upper plate, having a vacuum chamber 2 of recognized form (except for the depression 3) left by any suitable means already well-known in the art. I make the center mark by means disclosed in detail in a copending application filed by me, showing in the same application means also for providing a depressed surface of revolution about this point 3 during the manufacture of the plate. The difference in curvature of the floor of vacuum chamber 2 in different sections renders suction disk fastening thereto uncertain and unreliable. The surface is irregularly curved and the convexity in planes corresponding to Fig. 2 unfavorably affects the cupping action. There has also ordinarily been a tendency to wedge the disks outwardly and, where the seat has been prepared and this avoided, the pressure has been distributed over a width radially much too great to secure cupping benefit from any pressure exerted. I have avoided wedging by giving the greatest pressure upon the disk at a short distance outwardly from the aperture and have secured cupping by limiting the radial length of the section compressed. While I prefer a plane seat for the disk and countersink to obtain it, the seat at 4 in this countersunk portion may be concave whether of regular or irregular section and is shown as conical at $4'$ in Fig. 6 and spherical at $4^2$ in Fig. 8. It may even be slightly convex as at $4^3$ in Fig. 5 and its form must be determined largely by the shape and thickness of the plate and the preference of the operator. I prefer to use a normally flat rubber disk 5 of existing form and to get all of my cupping action by clamping the disk, making no use of the edges 6 left by the countersinking, which may be irregular in height, though these may slightly support the cup in case of ultimate partial breaking down where the disks are larger in diameter than the diameter of the portion countersunk. I compress the disk and retain it in cupped position by coöperating clamping members comprising a washer 7 presenting an annular rib in its cross section for engagement with the disk and a solid head tubular rivet shown in one form at 8. The most desirable relation between the slopes of the sides of the washer rib and its axis will depend upon the contour of the bottom of the countersunk recess at the point where the disk is pressed against it by the clamp and differs slightly in the several forms illustrated.

I seal the opening in the plate by the head of the rivet, counterboring the latter at 9 to receive it and aiding with cement, as at 10, or a gasket, as at 11 (Fig. 7), or by both, where desired. I illustrate rivet-setting pliers for application of my suction. One jaw 12 carries an anvil die 14 to fit the flat underside of the rivet and the other jaw 13 carries a turning die 15 whose annular projection 16 engages with the washer suitably as at 17 to compress the washer against the disk at the same time that the interior surface 18 turns and clenches the tubular part 19 of the rivet over the inner edge 20 of the washer.

The order of the parts in assemblage will be seen clearly from Fig. 3, where they are in separated position and Fig. 4, where they are combined. The rivet setting jaws preferably have parallel movement and carry a central pin 21 which centers the rivet and supports its walls.

I prefer to slope the outer part of the face of the washer rather more abruptly away from the seat than the inner part so as to permit the disk to cup as abruptly as it will under the clamping action, while making the rib of the washer as blunt as possible to avoid cutting or excessive crushing of the rubber under it. What I have designated as a rib upon the washer is preferably circular, though other substantially continuous forms coöperating with the seat would evidently cup the disk. To get the best results the contour of the rib should be turned slightly with respect to the axis of the aperture, if convex or concave seats be used, so as to maintain the same relation to the surface of the seat as is desirable with the plane seats throughout the section which pinches the disk. The rivet avoids turning of the clamping member and injury to the disk, gives uniform pressure, cannot work loose and can be removed readily by dental bur. The hollow in it increases the suction space and makes it more readily removable.

In Fig. 12 the plate is shown as cut away at the center with the suctions applied at various points. Application to a lower plate would be similar to this.

In my use of the term "disk" in the claims, I have considered it as including forms, whether flat or partially cupped, which are capable of being advantageously clamped or used in the manner called for by the claims to give or increase cupping action.

What I claim as new and desire to secure by Letters Patent is:

1. In a device of the character stated, a dental plate, apertured for suction attachment, in combination with a disk of flexible material, an annularly disposed narrow rib surrounding the aperture beginning at a distance radially from the walls of the aperture and having the sides of the rib at an angle to the adjoining surface of the plate, having the outside slope of the rib relieved to permit the disk to be cupped and means for retaining the rib in compression against the disk.

2. A dental plate having an aperture, a disk of flexible material, an annularly disposed narrow rib surrounding the aperture, beginning at a distance radially from the walls of the aperture and a compression and retaining device for the rib and plate.

JAMES HERMAN ABBOTT.

Witnesses:
   HELEN I. KAUFFMAN,
   WILLIAM STEELL JACKSON.

---

Copies of this patent may be obtained for five cents each, by addressing the "Commissioner of Patents, Washington, D. C."